(12) United States Patent
Stifelman

(10) Patent No.: US 10,848,614 B2
(45) Date of Patent: *Nov. 24, 2020

(54) PERSONALIZED CLOUD OF MOBILE TASKS

(71) Applicant: Microsoft Technology Licensing, LLC, Redmond, WA (US)

(72) Inventor: Lisa Stifelman, Palo Alto, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 64 days.

This patent is subject to a terminal disclaimer.

(21) Appl. No.: 14/204,521

(22) Filed: Mar. 11, 2014

(65) Prior Publication Data

US 2014/0194107 A1    Jul. 10, 2014

Related U.S. Application Data

(63) Continuation of application No. 12/343,929, filed on Dec. 24, 2008, now Pat. No. 8,693,993.

(51) Int. Cl.
*H04M 3/00* (2006.01)
*H04M 3/42* (2006.01)
(Continued)

(52) U.S. Cl.
CPC ......... *H04M 3/42* (2013.01); *H04M 1/27475* (2020.01); *H04M 1/72583* (2013.01);
(Continued)

(58) Field of Classification Search
CPC ............... H04M 3/42; H04M 1/27455; H04M 1/72583; H04M 1/72586; H04M 2250/22; H04M 2250/74
See application file for complete search history.

(56) References Cited

U.S. PATENT DOCUMENTS 6,381,474 B1   4/2002   Kraft
6,828,992 B1   12/2004  Freeman
(Continued)

OTHER PUBLICATIONS

U.S. Appl. No. 12/343,929, filed Dec. 24, 2008 entitled "Personalized Cloud of Mobile Tasks".
(Continued)

*Primary Examiner* — Pakee Fang

(57) ABSTRACT

A dynamically created and automatically updated personalized cloud of mobile tasks may be displayed on an interactive visual display via a personalized cloud generator application. The personalized cloud generator application may receive and/or capture information representing a mobile task performed by a mobile computing device user. The personalized cloud generator application may then store the information and determine a relevance of a given performed mobile task. If the relevance of the performed mobile task meets a prescribed threshold, the personal cloud generator application may display a selectable visual representation (e.g., selectable icon) of the performed mobile task. Given a user's activity, the visual representation may be automatically updated (displayed, removed, moved, resized, etc.) based on the information received and/or captured. Subsequent selection of the displayed visual representation allows quick and easy access or performance of the associated mobile task.

20 Claims, 8 Drawing Sheets

(51) Int. Cl.
*H04M 1/725* (2006.01)
*H04M 1/27475* (2020.01)

(52) U.S. Cl.
CPC .... *H04M 1/72586* (2013.01); *H04M 2250/22* (2013.01); *H04M 2250/74* (2013.01)

(56) References Cited

U.S. PATENT DOCUMENTS

| | | | |
|---|---|---|---|
| 6,850,949 | B2 | 2/2005 | Warner |
| 6,934,915 | B2 | 8/2005 | Rudd |
| 7,103,852 | B2 | 9/2006 | Kairis, Jr. |
| 2002/0135614 | A1 | 9/2002 | Bennett |
| 2006/0148477 | A1* | 7/2006 | Reilly ............... H04L 67/24 455/436 |
| 2007/0061332 | A1 | 3/2007 | Ramer |
| 2007/0073718 | A1* | 3/2007 | Ramer ............... G06F 3/0338 |
| 2007/0150444 | A1* | 6/2007 | Chesnais ............ H04L 67/24 |
| 2008/0134042 | A1 | 6/2008 | Jankovich |
| 2008/0163108 | A1 | 7/2008 | Patil |
| 2008/0313567 | A1* | 12/2008 | Sabin et al. ............... 715/835 |
| 2009/0012841 | A1 | 1/2009 | Saft et al. |
| 2009/0094277 | A1* | 4/2009 | Corrao ............ H04M 1/72566 |
| 2010/0159909 | A1 | 6/2010 | Stifelman |

OTHER PUBLICATIONS

Maximus, LG Adds Touch of Class to GSMA World Congress 2008, http://justamp.blogspot.com/2008/02/lg-adds-touch-of-class-to-gsma-world.html, 2008, pp. 1-4.

Schmidt, Albrecht, Jonna Haukkila, Richard Atterer, Enrico Rukzio, and Paul Holleis, Utilizing Mobile Phones as Ambient Information Displays, ttp://www.medien.ifi.lmu.de/pubdb/publications/pub/schmidt2006chiwip/schmidt2006chiwip.pdf, Apr. 22-27, 2006, pp. 1-6.

Yahoo Go 3.0, http://mobile.yahoo.com/go, 2008, pp. 1-2.

U.S. Official Action dated Dec. 7, 2011 cited in U.S. Appl. No. 12/343,929, 24 pgs.

U.S. Official Action dated Oct. 11, 2012 cited in U.S. Appl. No. 12/343,929, 19 pgs.

U.S. Appl. No. 12/343,929, Amendment and Response filed Jan. 27, 2012, 15 pages.

U.S. Appl. No. 12/343,929, Amendment and Response filed Jan. 11, 2013, 12 pages.

U.S. Appl. No. 12/343,929, Notice of Allowance dated Nov. 18, 2013, 12 pages.

\* cited by examiner

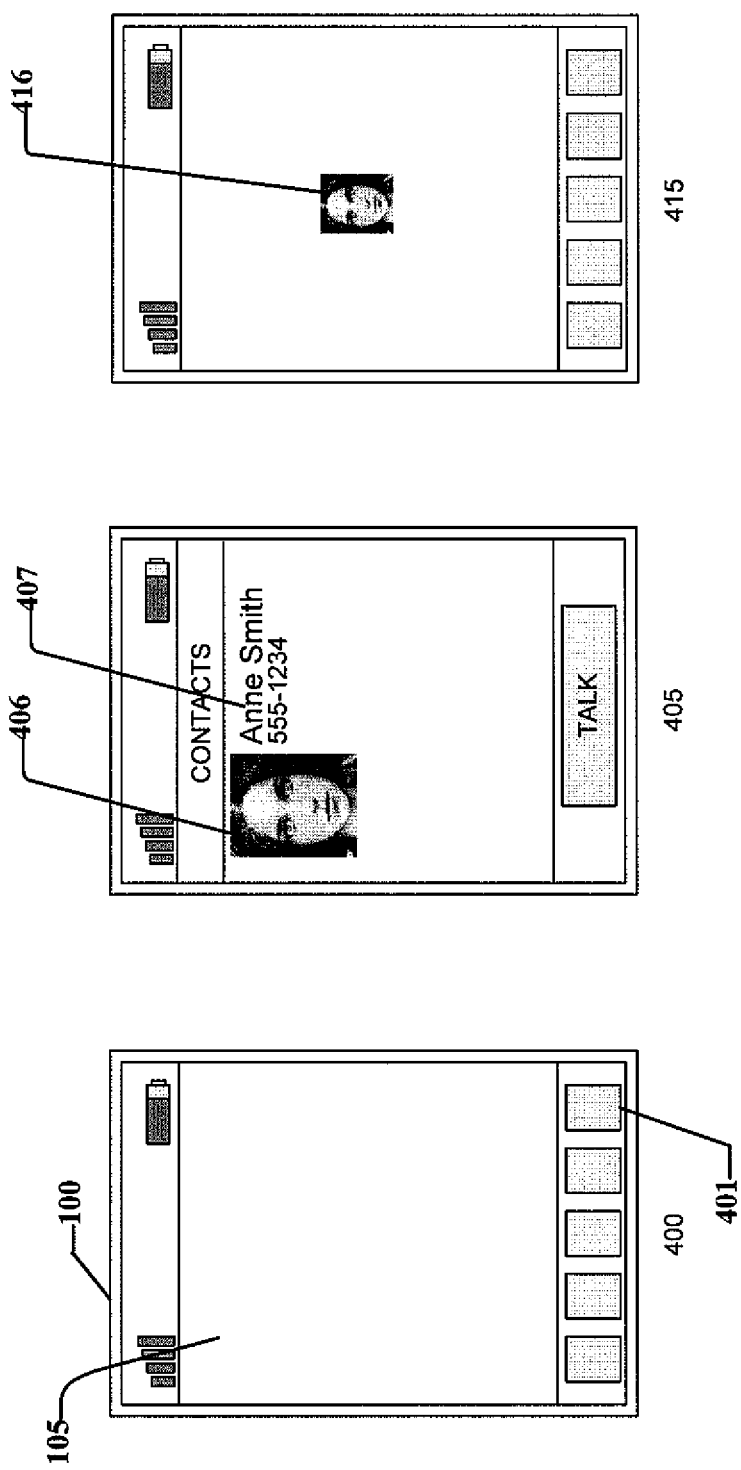

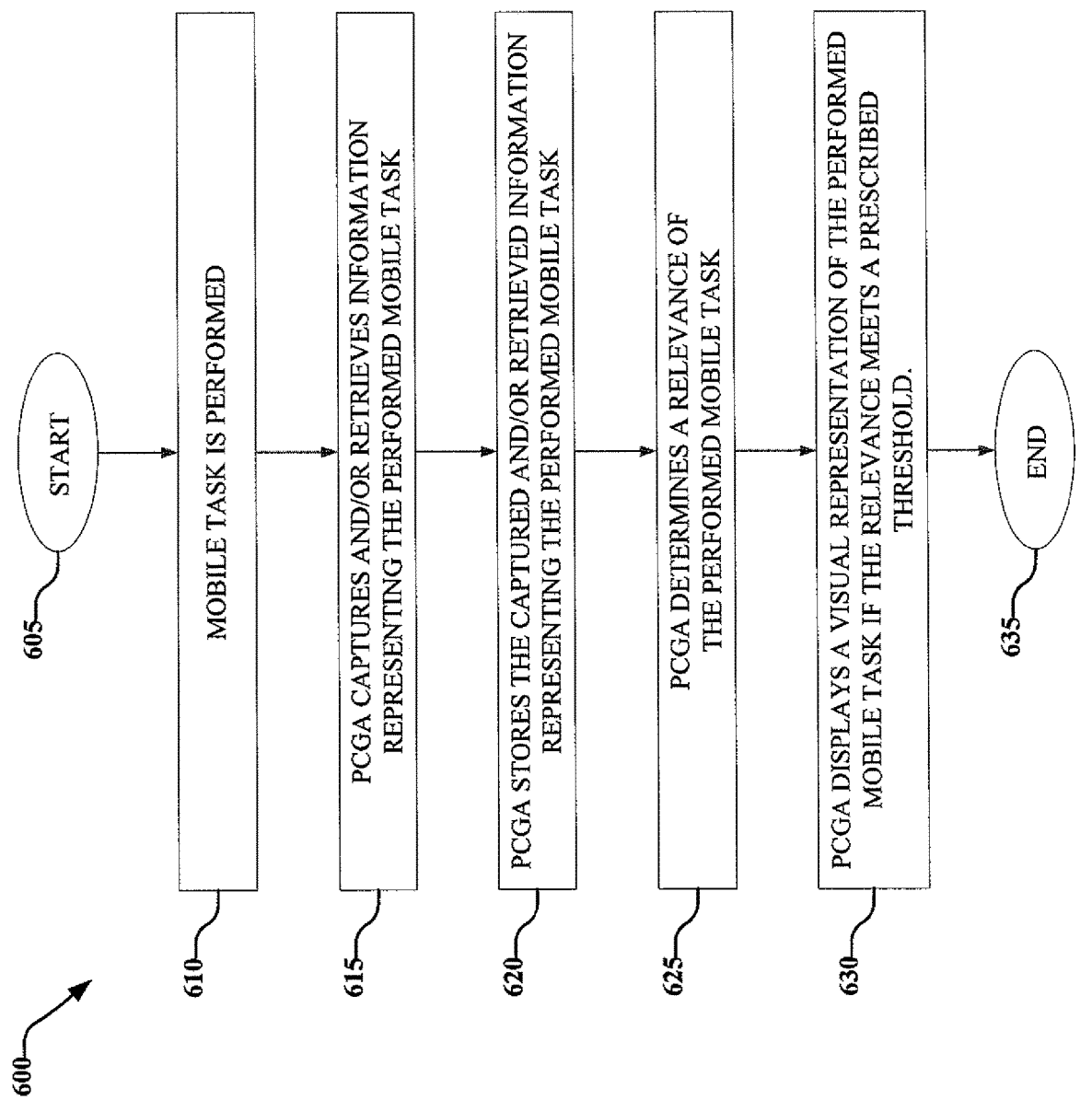

PERSONALIZED CLOUD OF MOBILE TASKS

CROSS-REFERENCE TO RELATED APPLICATIONS

This patent application is a continuation of U.S. patent application Ser. No. 12/343,929, filed Dec. 24, 2008 and entitled "Personalized Cloud of Mobile Tasks," issued as U.S. Pat. No. 8,693,993, the disclosure of which is incorporated herein, in its entirety, by reference.

BACKGROUND OF THE INVENTION

Many people use mobile computing devices on a daily basis for communication and information access. Most users utilize their mobile computing devices for a variety of tasks (e.g., making phone calls, instant messaging, e-mailing, checking the weather, sports results, tracking of stock market prices, news headlines, or music downloads). Each of these tasks can involve many steps on the mobile computing device through multiple applications. Many mobile computing device users utilize their devices for these and other tasks while in a distracted environment or on the move (e.g., while walking or driving). Thus, attempting to access a commonly utilized application can be very cumbersome. While mobile computing technology has advanced significantly to meet people's rapidly expanding work and personal needs, mobile computing devices do very little to adapt themselves based on a person's usage patterns and needs.

Methods and systems have been developed that allow mobile computing device users to personalize their devices to allow quick access to the applications they use most frequently. Some existing solutions include speed dial lists, favorite contacts, favorite websites, and customizable application icons on the home screen. While these solutions help the user to quickly access their more frequently used mobile tasks, they are manually implemented and are static in nature. If usage or calling patterns change (e.g., user meets a new friend, starts talking to an old friend more, starts working on a new project with different colleagues), the user would again need to go to the effort of manually changing the settings.

It is with respect to these and other considerations that the present invention has been made.

SUMMARY OF THE INVENTION

Embodiments of this present invention solve the above and other problems by providing a personalized cloud of mobile tasks on a mobile computing device. When one or more tasks are commonly performed on a mobile device, for example, calling a particular party or checking a particular resource, a visual representation (e.g., an icon or text label or other suitable user interface component) corresponding to each performed task may be dynamically generated and displayed on the mobile device display screen to allow quick and easy subsequent performance of a given task by selecting an associated displayed icon. Displayed icons may be selected via a variety of selection means, for example, touching a displayed icon, voice enabled selection or keyboard activated selection. Icons for associated tasks may be displayed based on a number of usage patterns, for example, the frequency of use of a particular task, the date/time of use of a particular task, or other relevance information such as location of the mobile, context of the use of a task, etc.

According to an embodiment, a personalized cloud generator application captures information about a performed mobile task, for example, identity of a performed task, date/time of performance of the task, frequency of performance of the task, and the like. In one embodiment, the personalized cloud generator application may be in the form of a mobile dialing, search and content application. In addition, the personalized cloud generator application may retrieve contextual information about a performed task, for example, presence information about a called party and real-time information (e.g., the score of a sporting event as it is happening) about a utilized resource. The personalized cloud generator application may store the captured and retrieved information, determines a relevance of a given performed mobile task, and may display a visual representation (e.g., an icon) of the performed mobile task if the relevance of the performed mobile task meets a prescribed threshold.

These and other features and advantages will be apparent from a reading of the following detailed description and a review of the associated drawings. It is to be understood that both the foregoing general description and the following detailed description are explanatory only and are not restrictive of the invention as claimed.

This summary is provided to introduce a selection of concepts in a simplified form that are further described below in the detailed description. This summary is not intended to identify key features or essential features of the claimed subject matter, nor is it intended as an aid in determining the scope of the claimed subject matter.

BRIEF DESCRIPTION OF THE DRAWINGS

FIGS. 4A, 4B, and 4C are simplified diagrams illustrating screenshots of an example mobile computing device displaying an example flow of how a visual interface may be created dynamically based on mobile tasks performed by a user.

FIG. 6 is a logical flow diagram illustrating a method for providing a personalized cloud of mobile tasks.

DETAILED DESCRIPTION

Figure 1:
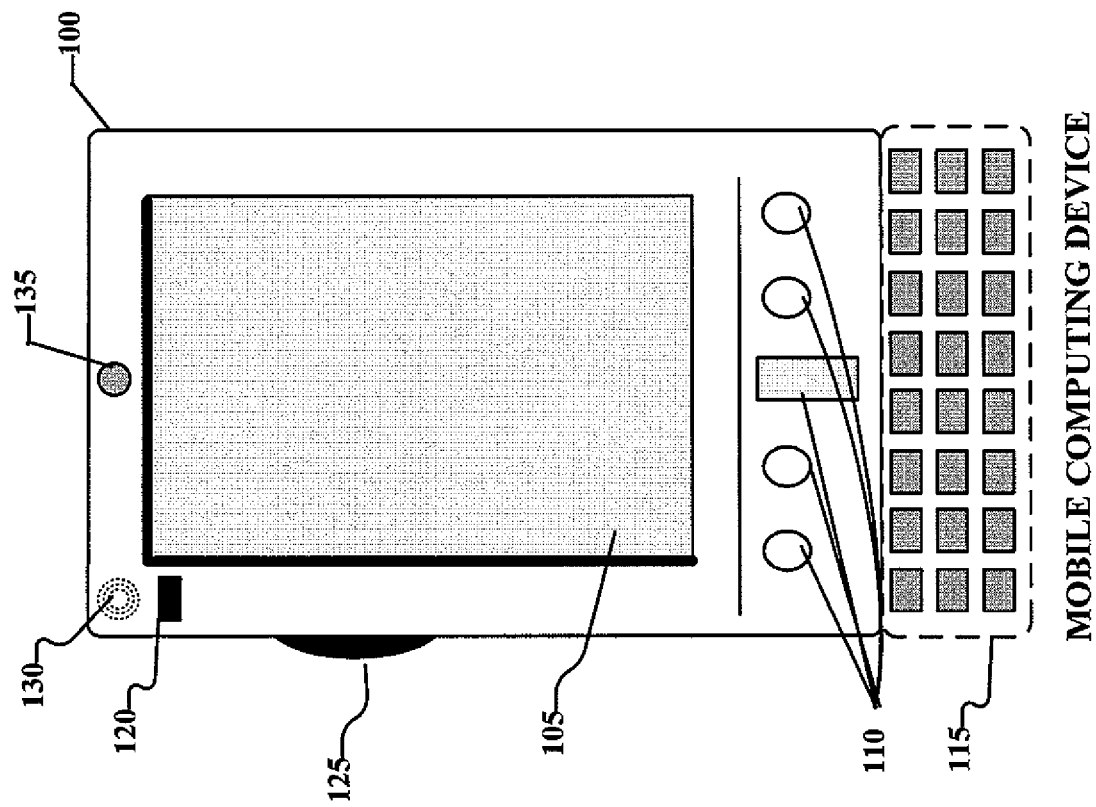
FIG. 1 is a diagram of an example mobile computing device.

As briefly described above, embodiments of the present invention are directed to providing an automatically created and dynamically updated personalized cloud of mobile tasks displayed via a mobile device user interface from gathered and/or retrieved information associated with one or more utilized tasks.

Given a user's activity (e.g., people called, calls received, businesses looked for, sports teams of interest, etc.), a personalized cloud generator application may create an iconic display representing the user's most commonly utilized tasks. As will be illustrated and described herein, the iconic display representing mobile tasks may take the form of selectable user interface components displayed on the display screen of the user's mobile device to allow quick and easy subsequent selection/performance of associated tasks. The selectable user interface components may be in the form of selectable icons representing tasks, for example, a displayed photograph to represent a contact, a displayed logo to represent a business or other entity, a displayed text string, a displayed clip art item, and the like. As should be appreciated any number of displayable and selectable icons may be used to represent a mobile tasks according to embodiments of the invention. The selection of displayed icons, the size, and the position of each displayed icon may reflect the relevance and importance to the user based on his/her activity. Other criteria that may impact the display of icons representing commonly utilized tasks may include time of day, location, context of use (e.g., driving vs. walking, at home vs. at work), who is nearby, who is available for communication (i.e., presence information) and the like.

The personalized cloud generator application may also adapt the display of individual icons based on factors such as time of day, day of the week, frequency or amount of use of a given task (i.e., usage patterns), etc. For example, a selectable icon in the form of a photograph of a particular called party may be displayed on a mobile telephone display screen to allow quick calls to the called party by touching or otherwise selecting the displayed photograph. The more a user of the mobile phone calls the called party, the larger called party's icon (displayed selectable photograph) becomes and/or the more centralized the display of the icon becomes. If the called party calls the user of the mobile phone frequently (and their calls are frequently answered/returned), the icon can become still larger/more centralized. For another example, if the called party is only called on the weekend, the displayed icon for the called party may be small (and peripherally displayed) during the week, and may be larger and more centrally located on the weekend.

Each displayed icon may also include status information relevant to the associated task. For example, if presence data for a called party accessible by the mobile device from an electronic calendaring application indicates the called party is not presently available for a phone call, such information may be displayed near the displayed icon.

The user may activate a mobile task associated with a given displayed icon by selecting the icon via one of a number of suitable icon selection mechanisms. A displayed icon may be activated via a touch interface (e.g., touching a called parties displayed photograph), or the displayed icon may be activated via other means such as voice activation or keyboard activation. For example, touching a displayed icon of a friend's photo may place a call to the friend and/or retrieve contact information, presence information, social network status for the friend, and the like. Selecting an icon for a business may bring up a details page with quick access to a map, directions or ability to call the friend. Selecting an icon, such as a logo for a favorite sports team, may cause the mobile device to retrieve a webpage for the team to allow the user to catch up on the latest news of the team, or alternatively, a link to the information the user is likely to want (e.g., current score). Selecting an icon for a movie theater may allow the user to see the current movie listings.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

It should be appreciated that various embodiments of the present invention may be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

The following is a description of a suitable mobile computing device, for example, a mobile phone with which embodiments of the invention may be practiced. With reference to FIG. 1, an example mobile computing device 100 for implementing the embodiments is illustrated. In a basic configuration, mobile computing device 100 is a handheld computer having both input elements and output elements. Input elements may include touch screen display 105 and input buttons 115 that allow the user to enter information into mobile computing device 100. Mobile computing device 100 may also incorporate an optional side input element 125 allowing further user input. Optional side input element 125 may be a rotary switch, a button, or any other type of manual input element. In alternative embodiments, mobile computing device 100 may incorporate more or less input elements. For example, display 105 may not be a touch screen in some embodiments. In yet another alternative embodiment, the mobile computing device is a portable phone system, such as a cellular phone having display 105 and input buttons 115. Mobile computing device 100 may also include an optional keypad 115. Optional keypad 115 may be a physical keypad or a "soft" keypad generated on the touch screen display.

Mobile computing device 100 incorporates output elements, such as display 105, which can display a graphical user interface (GUI). Other output elements include speaker 130 and LED light 120. Additionally, mobile computing device 100 may incorporate a vibration module (not shown), which causes mobile computing device 100 to vibrate to notify the user of an event. In yet another embodiment, mobile computing device 100 may incorporate a headphone jack (not shown) for providing another means of providing output signals.

Although described herein in combination with mobile computing device 100, in alternative embodiments the invention is used in combination with any number of computer systems, such as in desktop environments, laptop or notebook computer systems, multiprocessor systems, microprocessor based or programmable consumer electronics, network PCs, mini computers, main frame computers and the like. Embodiments of the invention may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments of the present invention.

Figure 2:
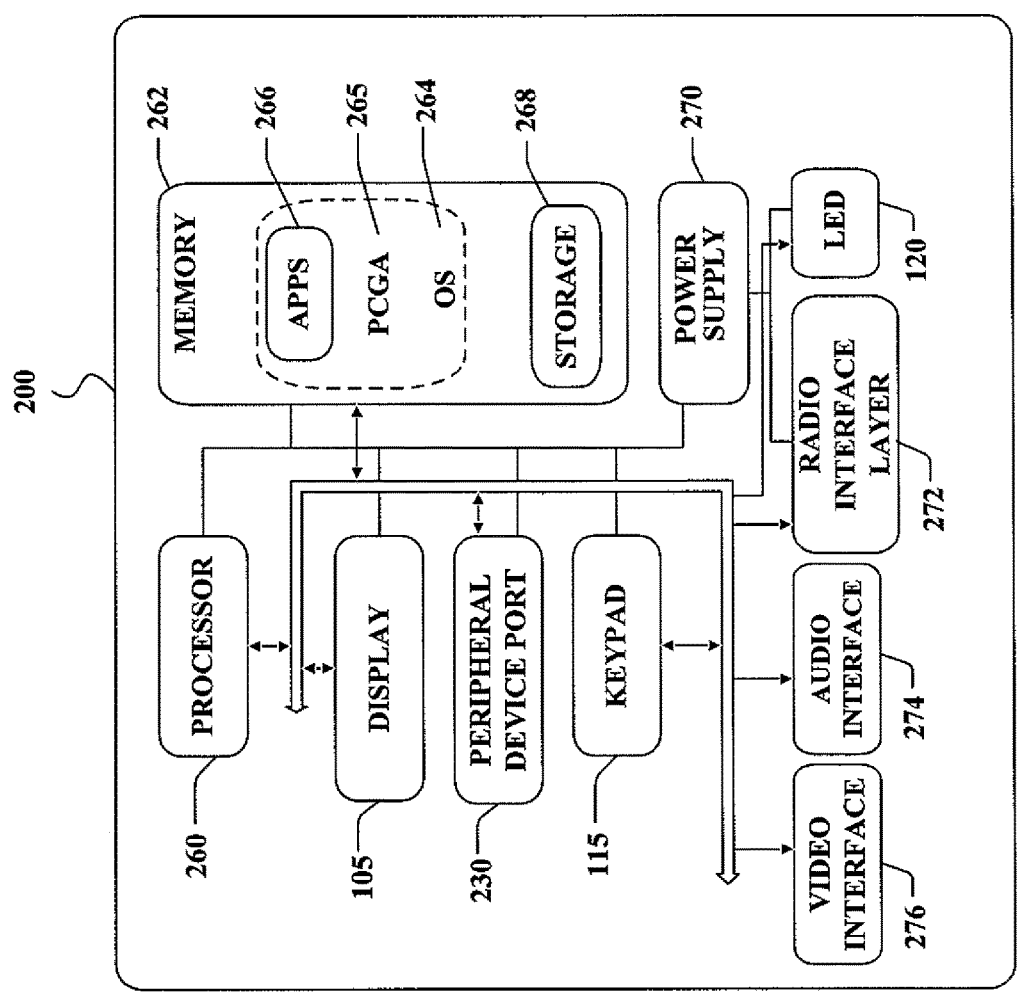
FIG. 2 is a simplified block diagram illustrating components of a mobile computing device that may serve as an exemplary operating environment for embodiments of the present invention.

FIG. 2 is a block diagram illustrating components of a mobile computing device used in one embodiment, such as the computing device shown in FIG. 1. That is, mobile computing device 100 (FIG. 1) can incorporate system 200 to implement some embodiments. For example, system 200 can be used in implementing a "smart phone" that can run one or more applications similar to those of a desktop or notebook computer such as, for example, browser, e-mail, scheduling, instant messaging, and media player applications. System 200 can execute an Operating System (OS) such as, WINDOWS XP®, WINDOWS CEO® available from MICROSOFT CORPORATION, REDMOND, WASHINGTON. In some embodiments, system 200 is integrated as a computing device, such as an integrated personal digital assistant (PDA) and wireless phone.

One or more application programs 266 may be loaded into memory 262 and run on or in association with operating system 264. Examples of application programs include phone dialer programs, e-mail programs, PIM (personal information management) programs, word processing programs, spreadsheet programs, Internet browser programs, messaging programs, and so forth. System 200 also includes non-volatile storage 268 within memory 262. Non-volatile storage 268 may be used to store persistent information that should not be lost if system 200 is powered down. Applications 266 may use and store information in non-volatile storage 268, such as e-mail or other messages used by an e-mail application, and the like. A synchronization application (not shown) also resides on system 200 and is programmed to interact with a corresponding synchronization application resident on a host computer to keep the information stored in non-volatile storage 268 synchronized with corresponding information stored at the host computer. As should be appreciated, other applications may be loaded into memory 262 and run on the device 100.

As will be described in detail below, the Personalized Cloud Generator Application (PCGA) 265 is a software application module operative to retrieve and/or capture information from a performed mobile task, to store and determine a relevance of the retrieved and/or captured information, and to display a visual representation of the performed mobile task if the relevance of the performed task meets a prescribed threshold.

System 200 has a power supply 270, which may be implemented as one or more batteries. Power supply 270 might further include an external power source, such as an AC adapter or a powered docking cradle that supplements or recharges the batteries.

System 200 may also include a radio 272 that performs the function of transmitting and receiving radio frequency communications. Radio 272 facilitates wireless connectivity between system 200 and the "outside world", via a communications carrier or service provider. Transmissions to and from radio 272 are conducted under control of OS 264. In other words, communications received by radio 272 may be disseminated to application programs 266 via OS 264, and vice versa.

Radio 272 allows system 200 to communicate with other computing devices, such as over a network. Radio 272 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of system 200 is shown with two types of notification output devices; LED 120 that can be used to provide visual notifications and an audio interface 274 that can be used with speaker 130 to provide audio notifications. These devices may be directly coupled to power supply 270 so that when activated, they remain on for a duration dictated by the notification mechanism even though processor 260 and other components might shut down for conserving battery power. LED 120 may be programmed to remain on indefinitely until the user takes action to indicate the powered-on status of the device. Audio interface 274 is used to provide audible signals to and receive audible signals from the user. For example, in addition to being coupled to speaker 130, audio interface 274 may also be coupled to a microphone to receive audible input, such as to facilitate a telephone conversation. In accordance with embodiments of the present invention, the microphone may also serve as an audio sensor to facilitate control of notifications, as will be described below.

System 200 may further include video interface 276 that enables an operation of on-board camera 135 to record still images, video stream, and the like.

A mobile computing device implementing system 200 may have additional features or functionality. For example, the device may also include additional data storage devices (removable and/or non-removable) such as, magnetic disks, optical disks, or tape. Such additional storage is illustrated in FIG. 2 by storage 268. Computer storage media may include volatile and nonvolatile, removable and non-removable media implemented in any method or technology for storage of information, such as computer readable instructions, data structures, program modules, or other data.

Data/information generated or captured by the device 100 and stored via the system 200 may be stored locally on the device 100, as described above, or the data may be stored on any number of storage media that may be accessed by the device via the radio 272 or via a wired connection between the device 100 and a separate computing device 330 associated with the device 100, for example, a server computer in a distributed computing network 320 such as the Internet. As should be appreciated such data/information may be accessed via the device 100 via the radio 272 or via a distributed computing network 320. Similarly, such data/information may be readily transferred between computing devices for storage and use according to well-known data/information transfer and storage means, including electronic mail and collaborative data/information sharing systems.

Figure 3:
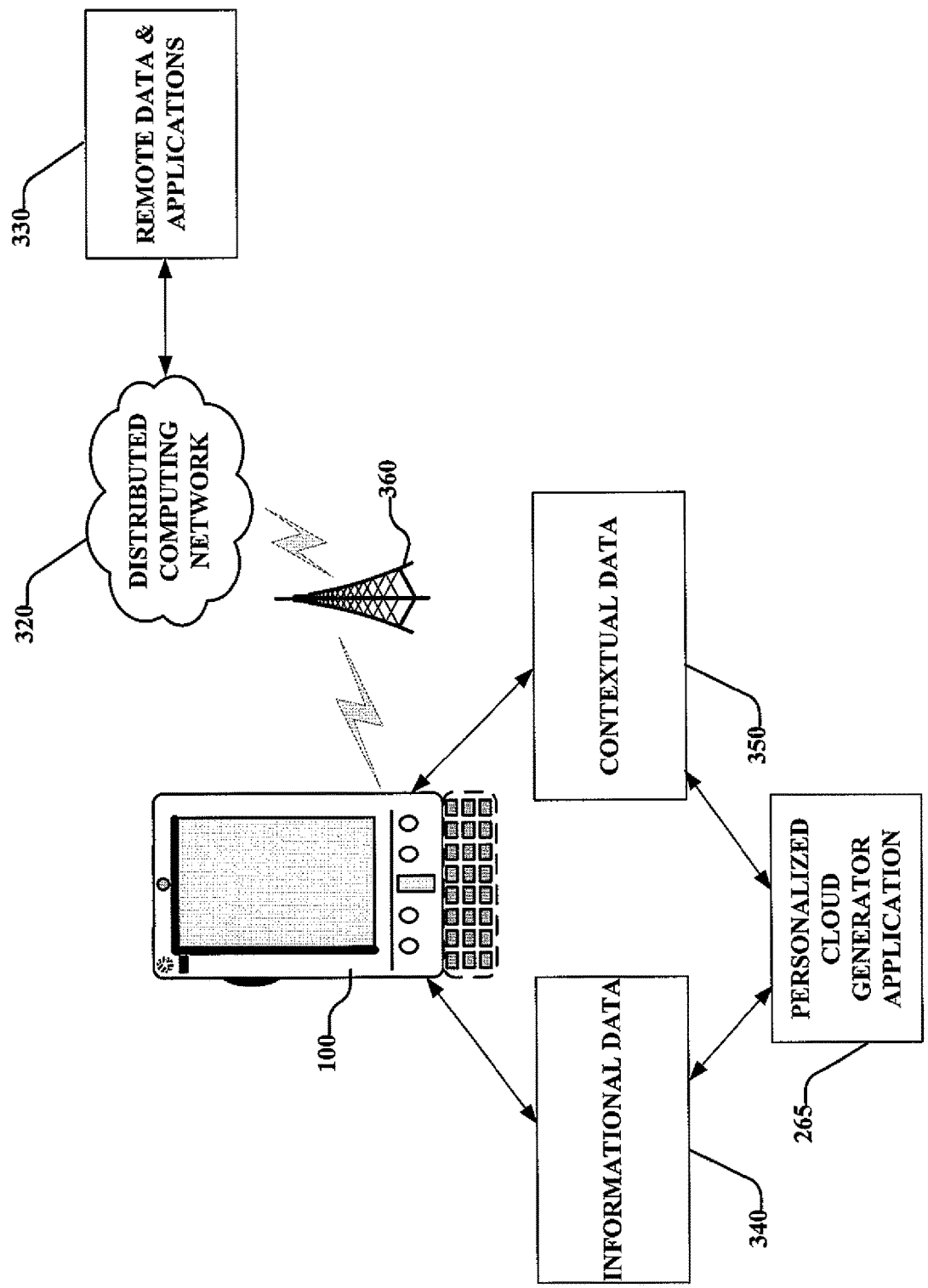
FIG. 3 is a simplified block diagram of a computing architecture for obtaining and utilizing information associated with the use of mobile applications.

FIG. 3 is a simplified block diagram of a computing architecture for obtaining information associated with the use of mobile applications. The mobile computing device 100 described above with reference to FIGS. 1 and 2 is operative to perform mobile tasks using one or more mobile applications 266 such as phone dialer programs, e-mail programs, PIM (personal information management) programs, word processing programs, spreadsheet programs, Internet browser programs, messaging programs, and so forth. The mobile computing device 100 is also operative to display a user interface on a screen display 105. As illustrated in FIG. 3, the device 100 is operative to generate, retrieve, store and utilize informational data and contextual data associated with a given mobile task in concert with the PCGA application 265, as described herein. The device 100 is operative to communicate with one or more remote data and applications 330 via a mobile network 360 and via one or more distributed computing networks 320.

According to an embodiment, the Personalized Cloud Generator Application (PCGA) 265 is provided for displaying a user interface on a mobile computing device 100, in the form of a mobile telephone and/or mobile application-enabled computing device, as illustrated above with reference to FIGS. 1 and 2. As is described below, the PCGA 265 is a software application module operative to retrieve and/or capture information from a performed mobile task, to store and determine a relevance of the retrieved and/or captured information, and to display a visual representation of the performed mobile task if the relevance meets a prescribed threshold. According to one embodiment, the PCGA 265 may take the form of a mobile dialing, search and content application adapted to provide and display selectable user interface components on a mobile device display screen as described herein (e.g., icons, text labels, photographs, clip art or any other suitable image or label that may be displayed to represent a mobile task). The selectable user interface components are visual representations of associated performed mobile tasks. As will be described below, the PCGA 265 may adapt the display of such selectable visual representations based the determined relevance of associated performed mobile tasks and on available data about associated performed mobile tasks.

Data representing a performed mobile task may be informational data 340, comprised of such data as the date the mobile task was performed, the time of day the mobile task was performed, the frequency with which the user activates the performed mobile task, the identity of the other party associated with the performed mobile task, etc. In addition, informational data 340 may include data generated by the PCGA 265 for determining the relevance of a given mobile task for determining whether and how a selectable visual representation (e.g., icon) of the given mobile task should be displayed for subsequent use. For example, if the relevance of a given mobile task, such as the calling of a particular called party, is determined based on the number of times that called party is called in a particular period (e.g., per day, per week, etc.), a count of the number of calls to that called party may be maintained by the PCGA 265 and data representing the count may be stored in informational data 340. Similarly, if relevance of a given mobile task is based on the time of day a given task is performed, then times of day of performances of the given mobile task may be stored by the PCGA 265 in the informational data 340 for use by the PCGA in determining whether the given mobile task warrants having an associated visual representation displayed by the PCGA to allow quick and easy subsequent access of the given mobile task. Informational data 340 may be stored, accessed and utilized locally on the mobile device 100, or alternatively the informational data 340 may be stored, accessed and utilized at a remote data and applications location 330, described below.

Data representing a performed mobile task may include contextual data 350, comprised of such data as the location of the mobile device 100 when the mobile task is performed, the location and/or the presence data of the other party associated with the performed mobile task when the mobile task is performed, the physical activity of the user when the mobile task is performed, etc. For example a global positioning satellite (GPS) system application 266 may be utilized for determining a location of the mobile device 100 when a call is made. Such information may be contextually relevant to determining whether and how to display a visual representation of a given mobile task. For example, if it is determined by the PCGA that a user calls her assistant each time she is located in a particular area, for example, on the freeway between the hours of 8:00 am and 9:00 am, the PCGA 265 may utilize location data for the mobile device to determine relevance of the associated task. Following with this example, each time the mobile device 100 is located on the example freeway between 8:00 am and 9:00 am the location and time of day information may be utilized by the PCGA 265 to display a selectable icon on the display screen 105 of the mobile computing device 100 representing the user's assistant to allow the user to quickly and easily call the assistant as she begins her commute to her office.

As should be appreciated, other types of contextual data 350 may likewise be utilized. For example, the PCGA 265 may access presence data for the example assistant, for example, via an electronic calendar application accessible by the mobile computing device 100. Following with the above example, if the PCGA would normally display a selectable icon for the user's assistant at the present time, but it is determined that the assistant is presently on holiday and not available for a call, the contextual data 350 in the form of presence data for the user's assistant may be utilized for determining whether and how the selectable icon should be displayed. As with the informational data 340, contextual data 350 may be stored, accessed and utilized locally on the mobile device 100, or alternatively the contextual data 350 may be stored, accessed and utilized at a remote data and applications location 330, described below. As should be appreciated, informational data 340 and contextual data 350 may be stored together or separately as illustrated in FIG. 3.

According to an embodiment, mobile tasks performed on the mobile computing device 100 and both informational data 340 and contextual data 350 associated with a given mobile task may be accessed, stored and/or maintained at one or more remote data and applications sites 330 via a distributed computing network 320, such as the Internet or a corporate intranet. For example, a given mobile task performed by a user may be accessing a favorite website 330 via the Internet 320. Information on a user's access of the example website via her mobile telephone 100 may be stored and monitored by the PCGA 265 at one or both of informational data 340 or contextual data 350. For example, if a user browses to a traffic information website every weekday between 8:00 am and 9:00 am, the PCGA may track her routine of the traffic information website. If her access to the website meets a prescribed threshold, for example, more than twice in a given week, then a selectable icon representing the traffic information website may be displayed on the display screen 105 of her mobile telephone so that the next weekday morning, the selectable icon is displayed on her mobile telephone (computing device) to allow her to quickly and easily access the desired website without having to browse to the website while she drives. As should be appreciated, many different remote applications and data may be accessed via the mobile device 100 and may be utilized by the PCGA 265 as described herein. For example, remote applications and data may include websites, calendaring and presence data for called parties, remote data servers, remotely stored and utilized software applications, such as GPS systems, etc. Also, as mentioned above, informational data 340 and contextual data 350 utilized by the PCGA for determining whether and how to display a selectable icon for a given mobile task may be stored remotely at one or more remote data and application sites such as a remote server accessible by the mobile computing device 100.

Having described example operating environments and an example operating architecture for embodiments of the invention, FIGS. 4A, 4B, 4C and 5 are simplified diagrams of screenshots of an example mobile computing device 100 illustrating when and how the PCGA 265 may display selectable icons representing performed mobile tasks when it is determined by the PCGA 265 that a given mobile task is sufficiently relevant to the user of the device 100 to display an associated selectable icon in a visual interface to allow the user to subsequently quickly and easily access the given mobile task.

Referring to FIG. 4A, screenshot 400 illustrates a display screen of a mobile telephone 100 with no selectable icons yet created by the PCGA on the display screen 105. Input component 401 is a representation of a shortcut within a user interface displayed on the screen display 105 that may be used to launch one of many mobile tasks or applications (e.g., contacts, calculator, calendar, voicemail, etc.). Referring to screenshot 405, consider that a user accesses a contacts list to find contact "Anne Smith" in order to place a call to the desired contact. As should be appreciated, the photographic icon 406 illustrated in screenshot 405 is for purposes of example only and is not limiting to the vast number of visual representations that may be used according to embodiments of the invention. For example, if a photograph of the contact is not available, a text label or a piece of clip art may be displayed. Text string 407 illustrated in screenshot 405 is an example of the contact information that may be displayed when a contact is selected. The user may select the icon representing "Anne Smith" to access more contact information, to make a call or send an SMS text message to "Anne Smith," to see her social network status, etc.

According to an embodiment, if the user of the device 100 utilizes the contacts data associated with the example contact "Anne Smith," both informational data 340 and contextual data 350 may be gathered, retrieved and stored about the utilization of the associated contacts data. For example, the day of week, time of day, and contextual information, such as presence data for the associated contact, a location of the mobile device, and the like, may be gathered by the PCGA 265, as described above with reference to FIG. 3. If it is determined by the PCGA 265 that this particular mobile task is sufficiently relevant, then a visual representation of the performed mobile task in the form of a selectable icon 416 representing the mobile task may be displayed by the PCGA 265 on the display screen 105 as illustrated in screenshot 415. For example, if the user of the mobile device 100 has placed a call to this particular contact more than a prescribed threshold, for example, three times in one week, a selectable icon 416 for the called contact may be displayed as illustrated in screenshot 415.

The selectable icon displayed by the PCGA may be based on information available to the PCGA 265 about the performed mobile task. For example, if a photograph associated with the performed mobile task is available, the PCGA 265 may generate and display and image of the photograph as a selectable icon. A text string representing the performed mobile task may be displayed as a selectable icon. A piece of clip art representing the performed mobile task may be displayed as a selectable icon. Indeed, any visual object that may be displayed on the display screen 105 may be utilized as a selectable icon. As should be appreciated, the PCGA may allow a user to designate a particular icon (e.g., photo, clip art, sketch, etc.) for use as a selectable icon for a given performed mobile task.

The user of the device 100 subsequently may quickly and easily access the example contact by selecting the example icon 416 without having to manually browse to a contacts list to locate the desired contacts information. As should be appreciated, the selectable icon 416 may be selected via any suitable selection means. For example, the icon 416 may be selected by a touch screen mechanism, by voice activation selection mechanism, by keyboard activated selection mechanism, and the like.

Figure 4B:
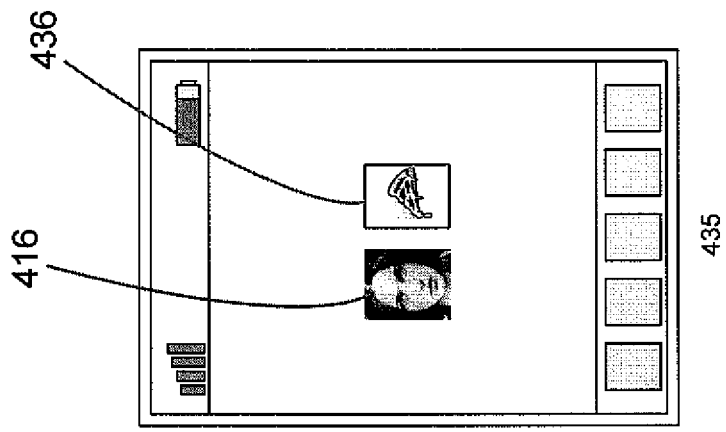
Figure 4B:
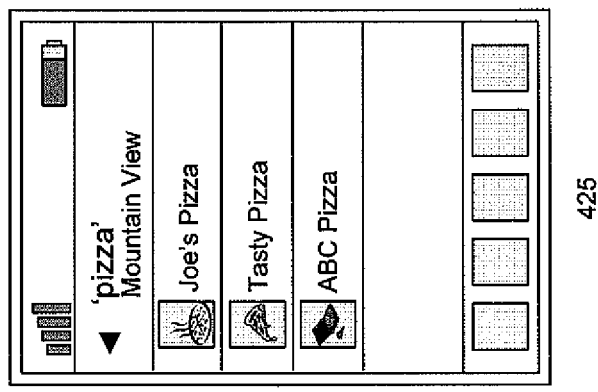
Figure 4B:
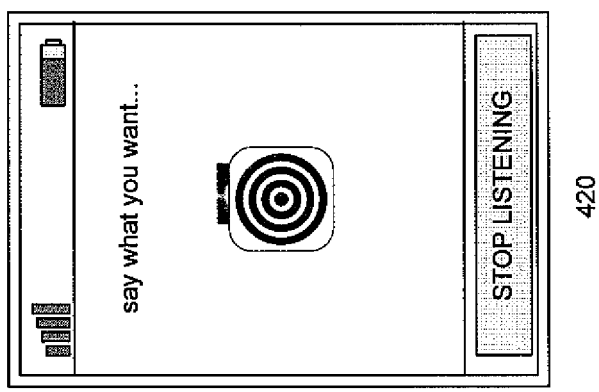

Referring now to FIG. 4B, another example operation of the PCGA 265 is illustrated. As illustrated in screenshot 420, a user of the device 100 utilizes voice activation for calling up a remote information site 330 for obtaining contacts information for one or more restaurants, for example, pizza delivery companies. After a display of one or more potential pizza delivery companies is provided to the user, as illustrated in screenshot 425, the user is free to select one or more of the displayed example pizza delivery companies. If the user selects one of the pizza delivery companies, for example, the "Tasty Pizza" company, the PCGA 265 may store information about the user's access to the selected pizza company information. For example, it may be determined by the PCGA 265 that this is the fourth time in the past month that the user has contacted this particular pizza delivery company. Or, the PCGA 265 may determine that the user always contacts this particular pizza delivery company when the user's mobile device is located in a particular city, as determined by a GPS application 266 available to the mobile device 100. If based on informational data 340 and/or contextual data 350, the PCGA 265 determines that access to the particular example pizza delivery company is sufficiently relevant to the user, a selectable icon 436 may be displayed in the display screen 105, as illustrated in screenshot 435, to allow the user subsequently to quickly and easily access the desired pizza delivery company without having to obtain contacts information for the pizza delivery company, as described above.

Figure 4C:
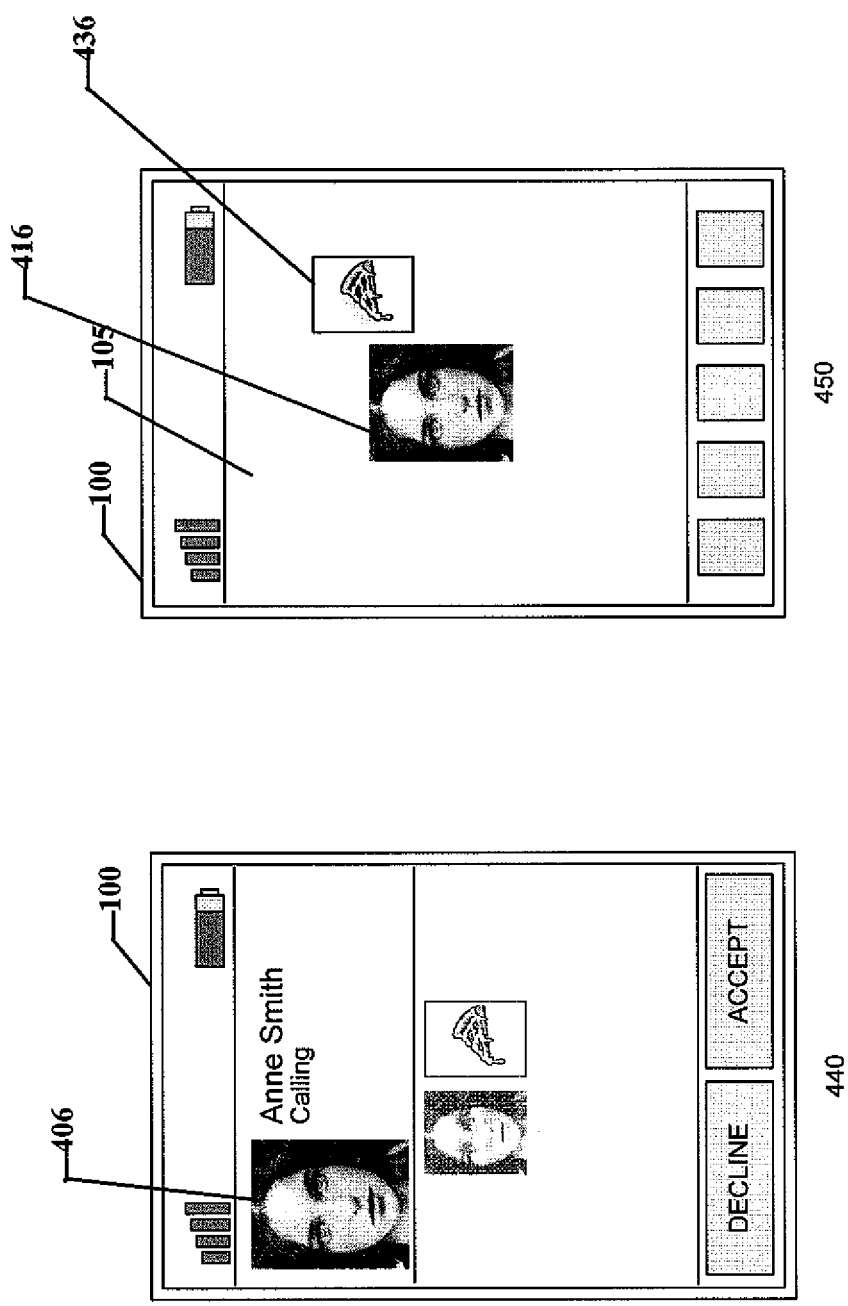

Referring now to FIG. 4C, the PCGA application may also dynamically change the way in which a selectable icon is displayed based on the relevance of an associated mobile task. As illustrated in FIG. 4C, if the example contact "Anne Smith" is either called by the user or calls the user of the device 100, or if contacts information or other information associated with the example contact "Anne Smith" is utilized via the device 100, the relevance of the example contact "Anne Smith" may be increased. For example, after receiving a call from the example contact "Anne Smith" as illustrated in screenshot 440, the PCGA 265 may determine that the example contact "Anne Smith" is more relevant to the user of the device 100 than other mobile tasks. Accordingly, the selectable icon 416 for the example contact "Anne Smith" may be increased in size on the display screen 105 to indicate its increased relevance to the user of the device 100 and to make selection of the icon 416 easier than selection of other icons, for example, the pizza delivery company icon 436. As should be appreciated, the selectable icon 416 may also be repositioned on the display screen 105 by the PCGA to show increased relevance. For example, the selectable icon 416 may be centered or moved to a prominent position such as the upper left corner.

As should be understood, just as the PCGA application may determine that the relevance of a given performed mobile task has increased based on a user's performance of the mobile task, the PCGA application may also determine that a mobile task previously considered relevant to the user of the device 100 has decreased in relevance, or is no longer relevant at all. For example, if a sufficient amount of time elapses and the user of the device 100 has not contacted the example Tasty Pizza company, and the PCGA application determines that performance of the task, for example, contacting the Tasty Pizza company is no longer relevant to the user of the device 100, the icon 436 may be removed from the display screen 105 by the PCGA 265. For example, the example pizza delivery company may be located in a particular city in which the user of the device 100 is temporarily deployed for her work. During the time she is deployed to the location of the example pizza delivery company, she may contact the pizza delivery company on a regular basis causing the PCGA 265 to display a selectable icon 436 for the example pizza delivery company. After the user departs from the area containing the example pizza delivery company, she may not contact the example pizza delivery company thereafter. If the PCGA 265 determines that the example pizza delivery company is no longer relevant to the user because, for example, the user does not contact the example pizza delivery company during a prescribed period of time, then the PCGA 265 may remove the selectable icon 436 for the example pizza delivery company from the display screen 105.

Figure 5:
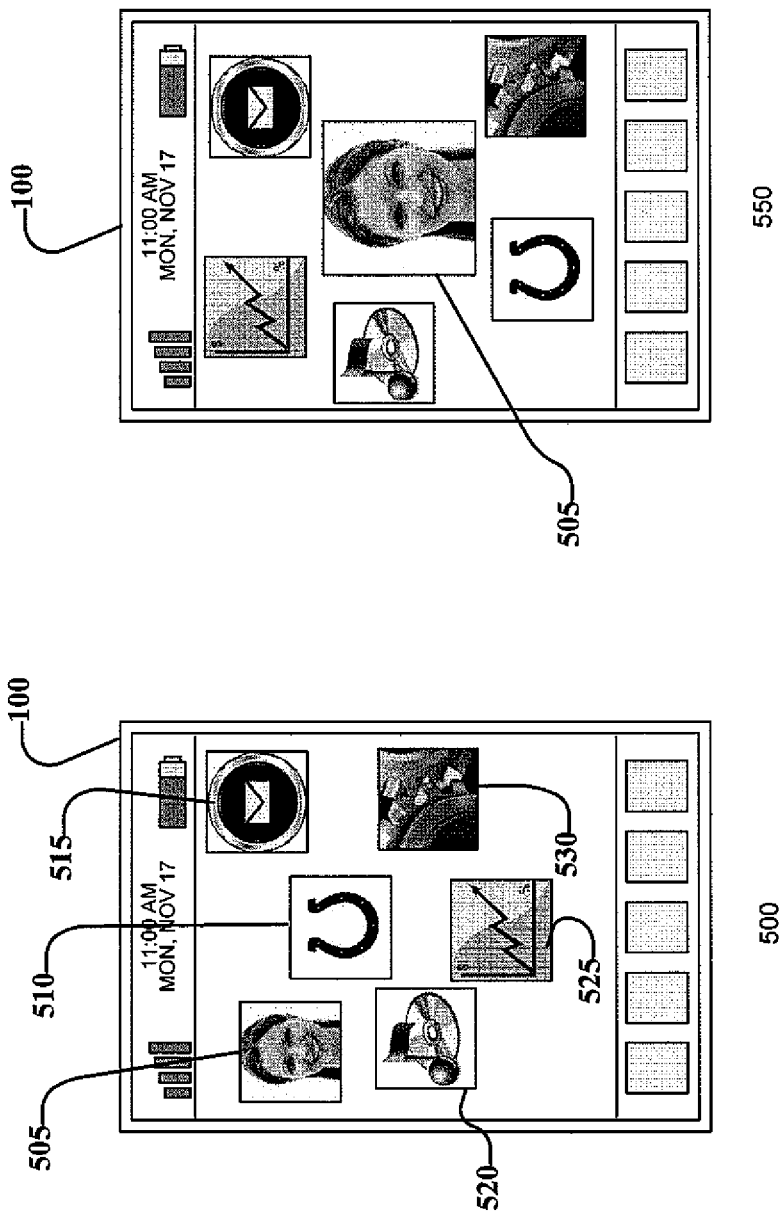
FIG. 5 is a simplified diagram illustrating screenshots of an example mobile computing device displaying another example flow of how a visual interface may be created dynamically based on mobile tasks performed by a user.

Referring now to FIG. 5, another example operation of the PCGA 265 is illustrated. Referring to screenshot 500, a personalized cloud of mobile tasks, represented by selectable icons for six different mobile tasks, has been displayed on the display screen 105 by the PCGA 265 because the PCGA has determined that mobile tasks associated with each of the displayed icons are sufficiently relevant to the user of the device 100. It should be appreciated that although the selectable icons 505, 510, 515, 520, 525, 530 in the example illustrated in FIG. 5 are displayed as a collage of icons, the selectable icons may also be displayed in a variety of other patterns, for example, in a linear pattern. Referring to the screenshot 500, a selectable icon 505 associated with a personal contact is displayed, a selectable icon 510 associated with the web site of a favorite sports team routinely accessed by the user is illustrated, a selectable icon 515 illustrating a frequently utilized electronic mail application is displayed, a selectable icon 520 illustrating a frequently used music application is displayed, a selectable icon 525 illustrating a financial services application particularly relevant to the user is displayed, and a selectable icon 530 illustrating an often utilized settings program for the device 100 is displayed.

As described herein, these example selectable icons are displayed because utilization of the associated mobile tasks, data, applications, or other information associated with these tasks has occurred in a manner causing the PCGA 265 to determine that these mobile tasks are particularly relevant to the user of the device 100 and that it would be good if the user could access these mobile tasks without having to browse to the associated mobile tasks to manually select the mobile tasks. It should be appreciated that although the example screenshots of FIG. 5 illustrate the displayed selectable icons linking to applications, the selectable icons may also be linked to personal contacts, businesses, and/or content. For example, rather than selectable icon 520 being linked to a frequently used music application, it could alternatively represent a frequently played song. For another example, selectable icon 510 may be linked to the information the user is likely to want (e.g., current score of his/her favorite sports team) rather than to the website of his/her favorite sports team.

As described above, if the user utilizes one or more of the displayed mobile tasks more frequently, or in another manner that causes the PCGA 265 to determine that the relevance of that task has increased, then the displayed selectable icon 505 for that task may be increased in size, as illustrated in screenshot 550. As illustrated in screenshot 550, the icon 505 has been increased in size relative to the other displayed selectable icons because the PCGA application 265 has determined that a mobile task associated with that displayed selectable icon, for example, calling an example contact, sending an e-mail or other message to the example contact, and the like, has increased in relevance to the user such that it would be good to make selection of tasks associated with that displayed icon easier or more prominent to the user of the device 100. Similarly, as described above, if performance of one of the mobile tasks associated with one of the example displayed selectable icons decreases in relevance, the PCGA 265 may decrease the size of the displayed selectable icon, and/or move the displayed selectable icon to a less central location, or may remove the displayed selectable icon altogether. As should be appreciated, changes in the display of a selectable icon may be made by the PCGA 265 in a gradual manner. For example, as a given mobile task becomes less relevant to the user, the position and/or size of the associated icon may gradually be changed to reflect the change in relevance.

Having described example operating environments and an example operating architecture for embodiments of the present invention with respect to FIGS. 1-3, and having described example displays of selectable icons included in a displayed personalized cloud of mobile tasks with respect to FIGS. 4-5, FIG. 6 is a logical flow diagram illustrating a method for providing an automatically created and dynamically updated personalized cloud of mobile tasks in the form of one or more selectable icons displayed on a display screen of a mobile computing device for performing associated mobile tasks as described above.

The method 600 begins at operation 605 and proceeds to operation 610 where a mobile task is performed. For example, a telephone call on a mobile telephone 100 may be initiated, a telephone call may be received via a mobile telephone 100, a web site of interest may be browsed to from a mobile computing device 100, or one or more software applications, for example, electronic mail applications, electronic calendaring applications, electronic contacts applications, or a variety of desktop applications, for example, word processing applications, spreadsheet applications, slide presentation applications, database applications, and the like may be utilized via the computing device 100. In addition, a number of applications associated with the mobile computing device 100, for example, settings applications, may be utilized via the mobile computing device 100 at operation 610.

At operation 615, the PCGA 265 captures information about the performed mobile task. For example, if a call is placed from the mobile computing device 100, identification information about the called party, a date and time of the placed call, whether or not the placed call is answered, whether the called party is included in the user's (calling party's) contacts database, etc. may be captured by the PCGA 265 when the mobile task is performed. In addition, any contextual information 350 associated with the performed mobile task may be captured at operation 615. For example, a GPS application may be utilized for determining a location of the mobile computing device with which the mobile task is performed or presence information about a called party may be obtained from an electronic calendaring application either stored locally at the mobile computing device 100 or accessible by the mobile computing device 100 via a remote data store 330 via a distributive computing network 320. At operation 620, the PCGA 265 stores the captured informational data 340 and/or retrieved contextual data 350 representing the performed mobile task.

At operation 625, the PCGA 265 determines a relevance of the performed task. As described above, the relevance of a given performed task may be based on a number of different relevance criteria. For example, for a call placed to a particular called party, if the call is placed from the mobile computing device 100 more than a prescribed number of times during a prescribed period, for example, four times in one week, a determination may be made that the called party or contacts information associated with the called party is sufficiently relevant for displaying a selectable icon on the display screen 105 of the mobile computing device 100. For another example, if the user browses to the website of a favorite sports team, and contextual information gathered by the PCGA 265 indicates that the sports team is presently engaged in a game, that contextual information combined with other information about the browsed to website may cause the PCGA 265 to determine that the browsed to web site is sufficiently relevant to warrant displaying a selectable icon on the display screen for allowing the user to subsequently quickly and easily browse to the favorite sports team web site by selecting the displayed icon.

Alternatively, following from this example, if the PCGA 265 determines that the user has only browsed to this particular sports website on an infrequent basis, and other information, for example, contextual information indicates that the sports team associated with the browsed to web site is not presently engaged in a game, the PCGA 265 may determine that the browsed to website is not sufficiently relevant to the user to warrant displaying a selectable icon for the browsed to web site. As can be seen from the foregoing examples, a vast number of suitable criteria and thresholds may be utilized by the PCGA 265 for determining whether the performance of a given mobile task warrants the display of a selectable icon for the mobile task for allowing quick and easy subsequent access to and performance of the mobile task.

At operation 630, if the performance of a given mobile task meets or exceeds a prescribed threshold, for example, a prescribed number of calls during a prescribed period, the PCGA 265 may display a visual representation of the performed task in the form of a selectable icon. As described above with reference to FIGS. 4 and 5, in addition to determining whether a given selectable icon should be displayed for a performed task, the PCGA 265 may also determine that a previously displayed selectable icon should be increased or decreased in size, moved to a more or less prominent location on the display screen 105, or whether a previously displayed selectable icon should be removed from the display screen altogether where the relevance of a given performed task has increased or decreased to warrant a change in the display of the associated selectable icon. The method 600 ends at operation 635.

Although the invention has been described in connection with various embodiments, those of ordinary skill in the art will understand that many modifications may be made thereto within the scope of the claims that follow.

I claim:

1. A method for generating a selectable icon to perform a mobile task using an application on a mobile device, comprising:
    receiving an indication that a first mobile task was performed using a first application on the mobile device, wherein the first mobile task corresponds to execution of the first application with one or more predefined task parameters and wherein the first mobile task relates to calling a contact; and
    in response to receiving the indication, determining a relevance of the first mobile task based at least in part on a determined frequency of the first mobile task associated with at least one of a specific location and a prescribed time; and
    when the relevance of the first mobile task meets a prescribed threshold:
        generating a first selectable icon representing the first mobile task that comprises an image associated with the contact, wherein the first selectable icon is displayed with a second selectable icon, the second selectable icon representing a second mobile task wherein the second mobile task corresponds to execution of a second application with one or more predefined task parameters for sending a message to the contact using the second application;
        performing, in response to a user selection of the first selectable icon, the first mobile task relating to calling the contact in the first application on the mobile device; and
        performing, in response to a user selection of the second selectable icon, the second mobile task relating to sending a message to the contact using the second application on the mobile device.

2. The method of claim 1, wherein determining the relevance of the first mobile task further comprises determining the relevance of the first mobile task based on an analysis of usage patterns of the first application on the mobile device.

3. The method of claim 2, wherein determining the relevance of the first mobile task further comprises comparing informational data about the indication that the first mobile task was performed with informational data about at least one previous performance of the first mobile task to determine whether the relevance of the first mobile task meets the prescribed threshold for displaying the first selectable icon representing the first mobile task.

4. The method of claim 3, further comprising using the contextual data associated with the indication that the first mobile task was performed to determine whether the relevance of the first mobile task meets the prescribed threshold for displaying the first selectable icon representing the first mobile task.

5. The method of claim 1, further comprising displaying at least the first selectable icon representing the mobile task in a prominent location on a display of the mobile device.

6. A system for generating a selectable icon to perform a mobile task using an application, comprising:
    a memory for storing executable program code; and
    a processor, functionally coupled to the memory, the processor being responsive to computer-executable instructions contained in the program code and operative:
        to receive an indication of a performance of a mobile task using an application on a mobile device, wherein the mobile task corresponds to execution of the application with one or more predefined task parameters and wherein the mobile task is associated with a business;

to determine a relevance of the mobile task based at least in part on a determined frequency of the mobile task performance associated with at least one of a specific location and a prescribed time;

to modify a display of a selectable visual representation corresponding to a plurality of mobile tasks to include a selectable icon representing the mobile task when the determined relevance of the mobile task meets a prescribed threshold, wherein the selectable icon representing the mobile task comprises a visual representation associated with the business; and to perform, in response to a user selection of the selectable icon, the mobile task associated with the business in the application on the mobile device.

7. The system of claim 6, wherein the processor is further operative to use contextual data associated with the performance of the mobile task to determine whether the relevance of the performance of the mobile task meets the prescribed threshold for displaying the selectable icon representing the mobile task.

8. The system of claim 6, wherein the processor, in modifying the display of the selectable visual representation is operative to display the selectable icon representing the mobile task in a prominent location on the display screen of the mobile device when the relevance of the performed mobile task increases.

9. The system of claim 6, wherein the processor, in modifying the display of the selectable visual representation is operative to display the selectable icon representing the mobile task in a less prominent location on the display screen of the mobile device when the relevance of the performed mobile task decreases.

10. The method of claim 1, wherein determining a relevance of the mobile task further comprises assessing data comprising a date the mobile task was performed.

11. The method of claim 1, wherein determining a relevance of the mobile task further comprises assessing data comprising a time of day the mobile task was performed.

12. The method of claim 1, wherein determining a relevance of the mobile task further comprises assessing data comprising a location of a party associated with the performed mobile task when the mobile task is performed.

13. The method of claim 1, wherein determining a relevance of the mobile task further comprises assessing data comprising at least one physical activity of a party associated with the performed mobile task when the mobile task is performed.

14. The system of claim 6, wherein the processor, in determining the relevance of the mobile task assesses data comprising a date the mobile task was performed.

15. The system of claim 6, wherein the threshold value is further based on availability data for a third party.

16. The computer-readable storage device of claim 6, wherein the threshold value is further based on availability data for a third party.

17. A method for generating a selectable visual representation corresponding to a mobile task on a computing device, comprising:

in response to identifying a first mobile task performed using a first application on the computing device, generating, based on context associated with the computing device and stored information associated with one or more previous performances of the first mobile task, a relevance for the first mobile task;

when the relevance for the first mobile task meets a prescribed threshold, generating a first selectable icon representing the first mobile task that comprises a visual representation of the first mobile task performed using the first application;

causing the first generated selectable icon to be presented by the computing device as part of the selectable visual representation corresponding to a plurality of mobile tasks on the computing device, wherein the selectable visual representation further comprises a second selectable icon associated with a second mobile task performed by launching, on the computing device, a second application with one or more predefined task parameters corresponding to the second mobile task; and in response to a user selection of the first selectable icon, performing the first mobile task by launching, on the computing device, the first application with one or more predefined task parameters corresponding to the first mobile task.

18. The method of claim 17, wherein causing the generated first selectable icon to be presented by the computing device as part of the selectable visual representation comprises causing the first selectable icon to be presented in a prominent location of the selectable visual representation when the relevance of the first mobile task increases.

19. The method of claim 17, wherein causing the first selectable icon to be presented by the computing device as part of the selectable visual representation comprises causing the first selectable icon to be presented in a less prominent location of the selectable visual representation when the relevance of the first mobile task decreases.

20. The method of claim 17, wherein the first application and the second application are the same application, and wherein the first mobile task and the second mobile task are different mobile tasks in the same application.

* * * * *